United States Patent Office 3,465,207
Patented Sept. 2, 1969

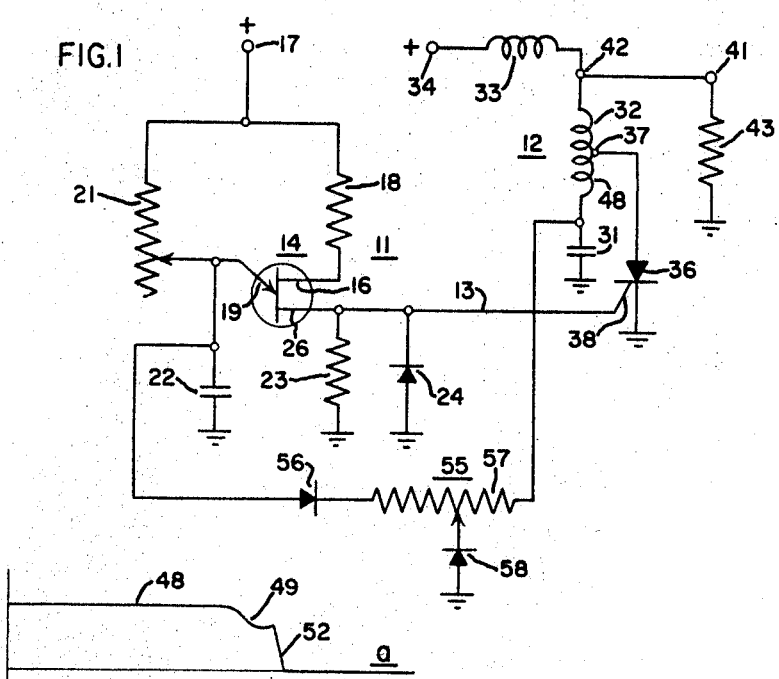
FIG.1
FIG.2
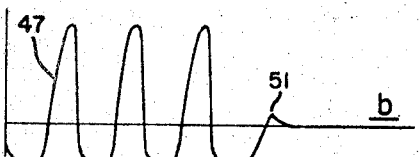
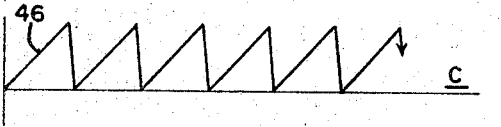
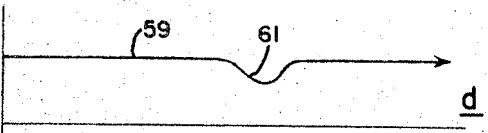
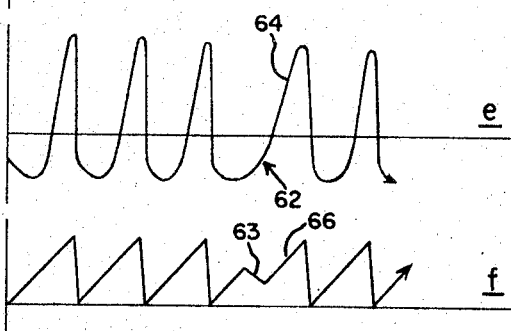
TIME
INVENTOR:
ANTON W. MERDIAN, JR.
BY Norman C. Fulmer
HIS ATTORNEY.

3,465,207
PROTECTION CIRCUIT FOR SCR PULSE GENERATOR
Anton W. Merdian, Jr., Mexico, N.Y., assignor to General Electric Company, a corporation of New York
Filed Dec. 29, 1966, Ser. No. 605,729
Int. Cl. H02h 7/00, 1/04; H03k 3/64
U.S. Cl. 317—33                                 6 Claims

ABSTRACT OF THE DISCLOSURE

A protection circuit is disclosed for use with a pulse generator employing an SCR (silicon controlled rectifier) type of device for periodically discharging a capacitor. The SCR is periodically triggered by a trigger circuit. The protection circuit is connected between the pulse generator and the trigger circuit and functions to permit the trigger circuit to operate only when the pulse generator is in proper operative condition, thus preventing damage to the SCR and other components which could occur if the SCR were triggered when the pulse generator was not operative such as due to insufficient operating voltage.

Background of the invention

The invention relates to pulse generators for producing periodic voltage pulses and employing an SCR type of device for periodically discharging a capacitor, the output pulses being, or being derived from, the periodic capacitor discharge pulses. In between the periodic discharges, the capacitor is charged by current from a voltage source, via a resistance and/or inductance connected between the capacitor and the voltage source. The SCR device is periodically triggered to the "on" condition (for discharging the capacitor) by means of a trigger circuit.

It is a characteristic of SCR devices that, when "on," they will not turn "off" unless the voltage across them is removed or becomes momentarily negative in polarity. One way of causing the SCR to turn "off" at the end of each capacitor discharge, is to provide some inductance in the discharge path which produces a reversed-polarity voltage due to self-induced voltage (commonly called "ringing") upon termination of the capacitor discharge, thus turning "off" the SCR.

Occasionally the aforesaid capacitor does not become charged up to a suitable voltage value by the time the SCR is triggered "on," to insure that an adequate reverse-polarity voltage will be obtained (such as by the aforesaid inductive "ringing" action) to turn off the SCR at completion of the capacitor discharge. When the SCR thus fails to turn off, the pulse generator undesirably fails to function, and other undesired effects are likely to occur such as burning out of the SCR due to its drawing a continuous large current from the voltage supply, and damage to the voltage supply because it usually is not designed to furnish a large amount of continuous current.

The aforesaid failure of the capacitor to become fully charged can be caused by various factors, such as a temporary or transient drop in operating voltage. Various ways have been considered for solving this problem, such as voltage regulation for the voltage supply (however, this adds to the expense and space requirements for the equipment, and is not entirely effective for large voltage variations such as occur when a motor-generator set is employed). The use of a fuse or circuit breaker, if it could effectively discriminate between the operating irregular current flow and the faulty steady current flow, would cause shut-downs of the pulse generator until replaced or reset.

Summary of the invention

Objects of the invention are to provide an improved protection circuit for SCR pulse generators, and to solve the prior-art problems described above.

The improved SCR protection circuit of the invention comprises, briefly and in a preferred embodiment, means connected between a pulse generator and its trigger circuit for inhibiting the trigger circuit whenever the pulse generator is not in proper operative condition. In a specific preferred embodiment, a protection circuit is connected between a periodically discharged capacitor of the pulse generator and a periodically discharged capacitor of the trigger circuit, and contains diode means arranged to inhibit charging of the trigger circuit capacitor whenever the pulse generator capacitor is not charged to proper operative voltage. Thus, by means of a simple, inexpensive, compact and reliable protective circuit, the pulse generator functioning is only momentarily delayed whenever there is a momentary faulty operating condition such as reduced power supply voltage.

Brief description of the drawing

In the drawing:
FIGURE 1 is an electrical schematic drawing of a preferred embodiment of my invention, and
FIGURE 2 is a time-plot of voltages occurring in the circuit.

Description of the preferred embodiment

FIGURE 1 shows a trigger circuit 11 connected to control a pulse generator 12 via a connection 13. The trigger circuit 11 comprises a unijunction transistor 14 having a first base electrode 16 connected to a direct voltage terminal 17 via a resistor 18, and a control electrode 19 connected to the voltage terminal 17 via an adjustable resistance 21. A capacitor 22 is connected between the control electrode 19 and electrical ground. A resistor 23 and diode 24 are connected in parallel between electrical ground and a second base electrode 26 of the unijunction transistor 14. The diode 24 is polarity-oriented to prevent undesired reverse-polarity transients from occurring on the connection 13.

The pulse generator 12 comprises a capacitor and inductors 32 and 33 connected in series between electrical ground and a terminal 34 of direct voltage. An SCR (silicon controlled rectifier) 36 is connected between electrical ground and a tap 37 on the inductor 32 and is polarity-oriented to be capable of being conductive for the polarity of voltage at terminal 34. A control electrode 38 of the SCR 36 is connected to the trigger pulse connection 13. A pulse output terminal 41 is connected to the junction of the inductors 32 and 33, and a load resistor 43 is connected between the output terminal 41 and electrical ground.

The circuit thus far described is known in the prior art, and its operation will now be explained. In the trigger circuit 11, the capacitor 22 charges from voltage at terminal 17 via the resistor 21, as indicated by the slope 46 on the trigger capacitor charge-discharge curve c in FIGURE 2. When the voltage charge on capacitor 22, which is applied to the control electrode 19 of unijunction transistor 14, reaches a certain value, transistor 14 becomes conductive and discharges the capacitor 22 through the electrode 19, second base electrode 26 and resistor 23, producing a voltage pulse across resistor 23 which is applied to connection 13. Trigger pulses are thus produced at a cyclic rate which is determined by the values of the resistor 21 and capacitor 22. In the pulse generator 12, the capacitor 31 is charged by current from the voltage terminal 34, via the inductors 32 and 33. This charging slope is indicated at 47 in curve b of FIGURE 2, and has a somewhat sinusoidal waveshape due to resonance effect of the capacitance and inductance of the charging circuit. When a trigger pulse is applied to the SCR control electrode 38 via the connection 13, the SCR 36 becomes conductive and discharges the capacitor 31 through the lower portion 48 of the inductor 32 and through the SCR 36. At the end of this discharge, a negative polarity pulse is self-induced in the lower portion 48 of inductor 32, this being called a "ringing" effect. This negative pulse renders the SCR 36 nonconductive at the completion of each discharge of capacitor 31. During each discharge of capacitor 31, the discharge current in the lower portion 48 of inductor 32 induces a relatively large voltage in inductor 32, thus producing an output pulse at terminal 41. The foregoing charge-discharge of capacitor 31 which occurs periodically, produces periodic pulses at terminal 41 which have a considerably higher value than that of the supply voltage terminal 34. The output pulses at terminal 41 may be used to control other circuits, or, if desired, may be rectified to produce a much higher value of direct voltage than that of the supply voltage at termnal 34.

In the event that an insufficient reverse-polarity pulse occurs in the lower portion 48 of inductor 32 at the end of a discharge period, the SCR 36 will fail to turn "off," and will conduct a large continuous current from the voltage terminal 34, through the relatively low resistance of the inductors 32 and 33. This can cause the SCR 36 to burn out, and also can cause damage to the voltage supply at terminal 34. In curve a of FIGURE 2, a representative direct voltage 48 is shown, and a temporary transient drop in this voltage is shown at 49. Such transient voltage drops are particularly likely to occur if the voltage at terminal 34 is supplied by a motor-generator set. When such a transient voltage drop occurs, the capacitor 31 will fail to charge adequately, this failure being indicated at 51 in curve b of FIGURE 2. The inadequate charging of capacitor 31, as indicated at 51, results in an inadequate "ringing" negative pulse for turning off the SCR 36 after it becomes triggered "on" by the trigger circuit 11, whereupon the SCR 36 then draws a large continuous amount of current from the voltage supply, and the voltage at terminal 34 drops to near zero as indicated at 52 in curve a of FIGURE 2.

In accordance with the invention, a protection circuit comprises a diode 56 and resistance 57 connected in series between the ungrounded terminal of capacitor 31 and ungrounded terminal of capacitor of 22, the diode 56 being polarity-oriented so as to be capable of conducting current from the trigger capacitor 22. Another diode 58 is connected between the electrical ground and a point on the resistor 57, and is polarity-oriented to conduct to ground any undesired negative transient pulses which may occur in the protective circuit. The protective circuit 55 functions as follows. If, when the trigger capacitor 22 is charging, the pulse generator capacitor 31 has not charged sufficiently so as to be capable of producing the required turn-off negative voltage for the SCR 36 upon being discharged, the diode 56 will be rendered conductive so as to inhibit the capacitor 22 from charging further until the generator capacitor 31 is charged sufficiently positively so that the protective diode 56 becomes nonconductive. To be more specific, if the voltage charge on the generator capacitor 31 is sufficiently greater than that of the trigger capacitor 22, by an amount dependent in part on the voltage drop across the diode 56 and resistor 57, then the protective diode 56 will be nonconductive and the circuit will perform normally, whereas if the generator capacitor 31 is not charging normally, the relative voltages of the capacitors applied to the diode 56 will render this diode conductive, thus inhibiting further charging of the trigger capacitor 22 until the generator capacitor 31 is adequately charged for the circuit to function properly.

Curves d, e, and f in FIGURE 2 illustrate the function of the protective circuit. In curve d, the normal operating voltage at terminal 34 is indicated at 59, and a temporary undesired voltage drop is indicated at 61. When the supply voltage drop 61 occurs, the generator capacitor 31 fails to charge adequately, as indicated at 62 in curce e of FIGURE 2, whereupon the protective circuit diode 56 becomes conductive and inhibits further charging of trigger capacitor 22, and, in fact, causes it to become, slightly discharged, as indicated at 63 in curve f in FIGURE 2. However, when the generator capacitor 31 becomes charged following the transient drop in supply voltage, as indicated at 64 in curve e of FIGURE 2, the protective circuit 55 permits trigger capacitor 22 to continue its charging cycle as indicated at 66 in curce f of FIGURE 2 and the circuit continues to function normally.

The invention achieves, by the addition of simple, economical and reliable circuitry, insurance of continued operation of the pulse generator in spite of any abnormalties in charging of the generator capacitor 31 and additionally protects the SCR 36 from possible burning out and also protects components in the voltage supply at terminal 34.

While a preferred embodiment of the invention has been shown and described, various other embodiments and modifications thereof will be apparent to persons skilled in the art, and will fall within the scope of invention as defined in the following claims.

I claim:

1. A pulse-producing circuit arrangement comprising a pulse generator adapted to produce pulses under the control of periodic trigger pulses, and a trigger circuit connected to provide said trigger pulses to said pulse generator, said pulse generator comprising a source of voltage, a capacitor, an impedance element connected between said capacitor and said source of charging voltage for charging said capacitor from said voltage, and and SCR-type device connected to periodically discharge said capacitor under the control of said trigger pulses, said trigger circuit comprises a source of trigger charging voltage, a trigger capacitor, an impedance element connected between said trigger capacitor and said source of trigger charging voltage for charging said trigger capacitor from said trigger voltage source and means for periodically discharging said trigger capacitor when the voltage charge thereon reaches a given value thereby producing said trigger pulses, wherein the improvement comprises a protective circuit interconnected between said capacitors of the trigger circuit and pulse generator and adapted to inhibit said charging of the trigger capacitor in the event that the voltage charge of the pulse generator capacitor fails to have reached a proper operative value during said charging thereof.

2. A circuit arrangement as claimed in claim 1, in which said protective circuit comprises a diode and a resistance connected in series between the junction of the capacitor and impedance element of said pulse generator and the junction of the capacitor and impedance element of said trigger circuit, said diode being polarity-oriented to become conductive and cause said inhibiting of the charging of said trigger capacitor in the event that the voltage charge of the pulse generator capacitor fails to have reached a proper operative value during said charging thereof.

3. A circuit arrangement as claimed in claim 2, including a further diode connected between a point on said protective circuit resistance and a point of reference potential and polarity-oriented to conduct reverse-polarity transients.

4. A circuit arrangement as claimed in claim 1, in which said impedance element of the pulse generator comprises a charging inductance means connected to a terminal of said capacitor of the pulse generator, said SCR-type device being connected between a tap on said charging inductance means between the ends thereof and the remaining terminal of said capacitor of the pulse generator, and means connected to said inductance means for obtaining output pulses therefrom.

5. A circuit arrangement as claimed in claim 4, in which said protective circuit comprises a diode and a resistance connected in series between the junction of the capacitor and impedance element of said pulse generator and the junction of the capacitor and impedance element of said trigger circuit, said diode being polarity-oriented to become conductive and cause said inhibiting of the charging of said trigger capacitor in the event that the voltage charge of the pulse generator capacitor fails to have reached a proper operative value during said charging thereof.

6. A circuit arrangement as claimed in claim 5, including a further diode connected between a point on said protective circuit resistance and a point of reference potential and polarity-oriented to conduct reverse-polarity transients.

References Cited

UNITED STATES PATENTS 3,128,396   4/1964   Morgan.
3,271,700   9/1966   Gutzwiller.
3,281,638   10/1966   Crawford _____ 317—33 X LEE T. HIX, Primary Examiner R. V. LUPO, Assistant Examiner U.S. Cl. X.R.

307—108; 317—49; 320—1